United States Patent [19]

Paitula

[11] 4,099,685
[45] Jul. 11, 1978

[54] LOCKING DEVICE IN SAFETY SEAT BELTS FOR VEHICLES

[75] Inventor: Hannu Olli Paitula, Jarna, Sweden

[73] Assignee: Granges Essem Aktiebolag, Vasteras, Sweden

[21] Appl. No.: 748,393

[22] Filed: Dec. 7, 1976

[30] Foreign Application Priority Data

Sep. 12, 1975 [SE] Sweden .............................. 7513885

[51] Int. Cl.² ...................... A62B 35/02; B65H 75/48
[52] U.S. Cl. ....................... 242/107.4 B; 242/107.4 A
[58] Field of Search .................. 242/107.4 R–107.4 E; 297/388; 280/744–747

[56] References Cited

U.S. PATENT DOCUMENTS

| | | | |
|---|---|---|---|
| 3,510,085 | 5/1970 | Stoffel | 242/107.4 B |
| 3,770,225 | 11/1973 | Boblitz | 242/107.4 B X |
| 3,929,300 | 12/1975 | Lindquist | 242/107.4 B |
| 3,991,953 | 11/1976 | Takada | 242/107.4 A |

Primary Examiner—Harvey C. Hornsby
Assistant Examiner—John M. Jillions
Attorney, Agent, or Firm—Browdy and Neimark

[57] ABSTRACT

A locking device for vehicle safety seat belts of the type in which a strap of the seat belt is automatically retracted and wound onto a wind-up shaft when the seat belt is not in use, for preventing rapid extension of the strap. The device comprises a rotatable body rigidly attached to one end of the shaft and arranged to rotate with the shaft; a stop means positioned outside the rotatable body and fixedly mounted in relation to the shaft; and at least one elongated locking member movable in relation to the rotatable body and positioned between the rotatable body and the stop means. The locking member is movable on a guiding surface on the rotatable body from a radially seen inner position, free position, in which it does not prevent rotation of the rotatable body, to a radially seen outer position, locking position, in which it engages with both the stop means and the rotatable body and, thus, prevents further turning of the rotatable body. An inertia means is pivotally mounted on the shaft adjacent the rotatable body and is provided with a guiding slot for each locking member. A spring means is further arranged to keep the rotatable body and the inertia means in a determined angular position in relation to each other when the strap is slowly extended and arranged to yield when the strap is rapidly extended, so that the rotatable body and the inertia means change angular position in relation to each other, whereby the locking member is moved and guided in the slot of the inertia means from the free position to the locking position.

14 Claims, 3 Drawing Figures

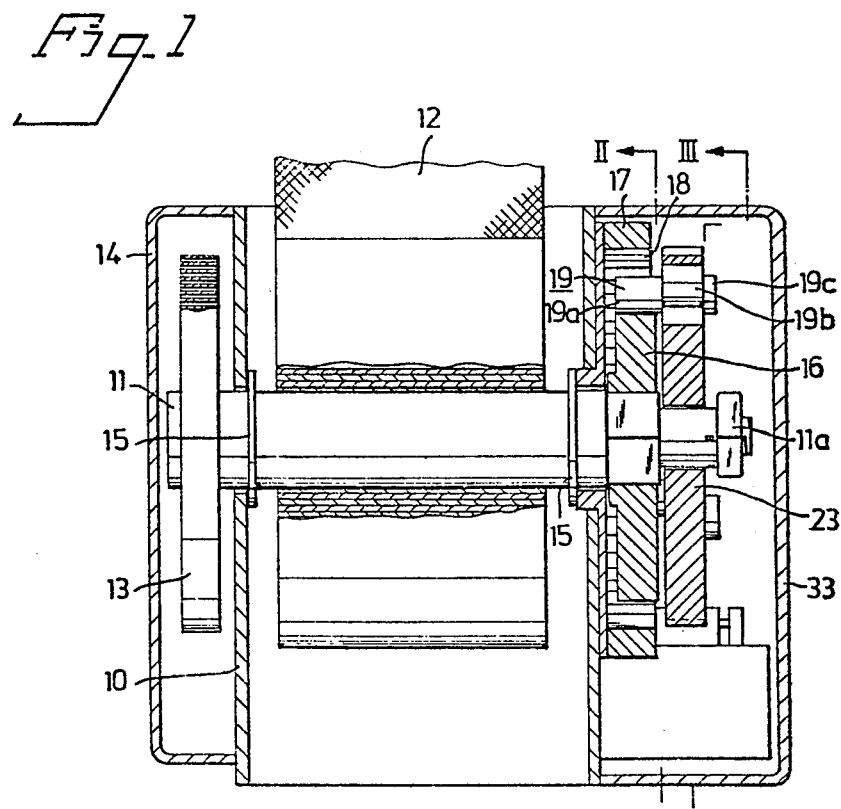
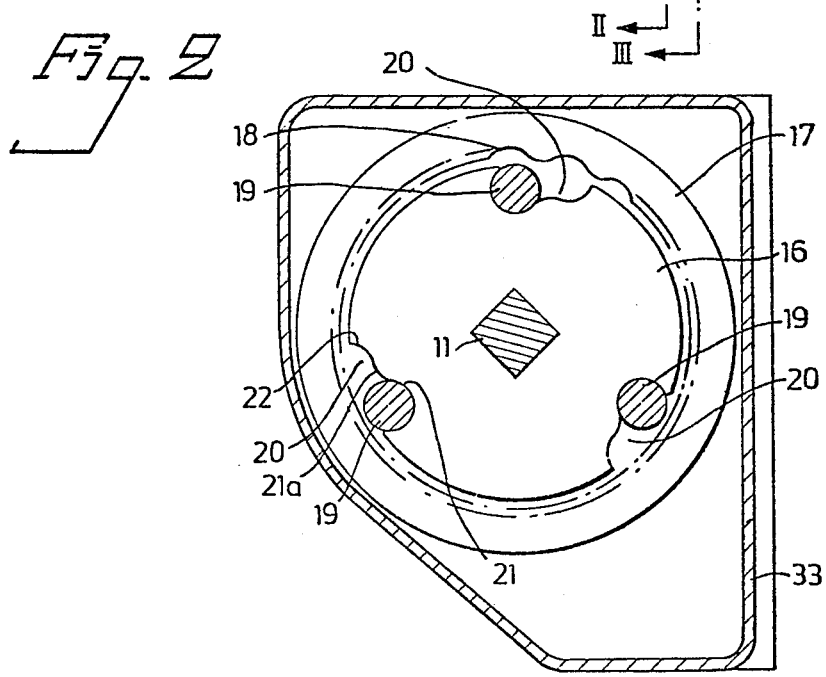

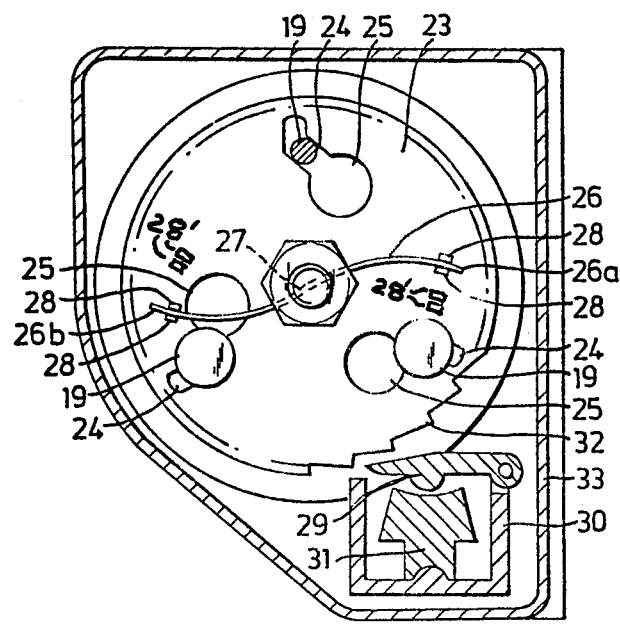

LOCKING DEVICE IN SAFETY SEAT BELTS FOR VEHICLES

BACKGROUND OF THE INVENTION

The present invention relates to a locking device for vehicle safety seat belts of the type in which a strap of the seat belt is automatically retracted into a cover and wound onto a wind-up reel when the seat belt is not in use, for locking the reel when the strap in the seat belt is rapidly extended.

It is known in the prior art to provide locking of a reel in a safety seat belt retractor by using a locking member which is resting in a rotatable body, the body being attached to the reel and rotating with the reel, and which is movable in the rotatable body between an inner position (radially seen) and an outer position. In the inner position, free position, the locking member does not prevent rotation of the rotatable body, and in the outer position, locking position, the locking member engages with a fixed stop means mounted around the reel and prevents further rotation of the rotatable body, so that the reel is locked and further extension of the seat belt strap is prevented. In these devices the movement of the locking member is normally controlled by an inertia means which is pivotally mounted on the reel and which follows the rotatable body in its rotation when the strap is slowly extended from the reel. Due to its inertia, however, the inertia means is turned in relation to the rotatable body when the strap is rapidly extended, whereby the locking member is moved from the free position to the locking position. The inertia means is actuated by a spring, so that it normally keeps the locking member in the free position. Locking devices of this type are disclosed, for example, in the U.S. Pat. Nos. 3,442,467 and 3,770,225.

In locking devices of the type described above it is difficult to hold and control the locking member or locking members, as normally several locking members are used for locking the rotatable body, in a simple and reliable way. Therefore, the previously known locking devices are complicated in mechanical respect which means high manufacturing costs and frequently insufficient reliability in operation. In the device according to the U.S. Pat. No. 3,442,467 balls are used as locking members, and the balls are held and controlled between the locking position and the free position by a special member which is turned by an inertia means and which by means of extending tabs holds and controls the balls in notches in the rotatable body when locking and releasing, respectively, the body rotating with the reel. As the balls are moved in a radial direction when locking and releasing, respectively, it is difficult to provide with certainty holding and controlling functions in all positions by such a pivotally mounted means on the reel. In the device according to the U.S. Pat. No. 3,770,225 cylindrical rollers are used as locking members. These rollers are kept in slots in a cage member and are movable in radial direction by turning a pawl hub mounted in the cage member in relation to the cage member keeping the rollers. In this device the rollers are kept in their inner positions, free positions, by means of a spring ring surrounding the cage member. Thus, the spring force from the spring ring has to be overcome, when the rollers have to be moved to their locking positions. Also this device is complicated to manufacture and difficult to adjust.

SUMMARY OF THE INVENTION

The main object of the present invention is to provide a locking device of the type described in the beginning which ensures a better holding and controlling of the locking members and which is simple in its design and therefore cheap to manufacture and reliable in operation. This object is obtained by giving the locking device according to the invention the features set forth below.

By providing the inertia means with guiding slots for the locking members and by designing the inner end of these guiding slots to form an angle with the radius is obtained, besides a reliable control of the movement of the locking members, that the influence of the centrifugal force is minimal, because the outer edge of the guiding slot takes up this force, so that the movement of the inertia means will be decisive for the movement of the locking members. This provides a very good possibility to accurately set the limit at which the locking device has to operate. Further, due to the fact that the outer portions of the slots are bent in an angle outwards is obtained that the locking members are more rapidly brought into engagement with the stop means and that the risk of unintentional locking of the reel due to shakings and vibrations is reduced.

BRIEF DESCRIPTION OF THE DRAWINGS

One embodiment of the invention shall now be described more in detail with reference to the attached drawings.

FIG. 1 is a sectional view of a safety belt retractor in which the invention is used.

FIG. 2 is a sectional view through the retractor along the line II—II of FIG. 1.

FIG. 3 is a sectional view through the device along the line III—III of FIG. 1.

DETAILED DESCRIPTION OF THE PREFERRED EMBODIMENT

The wind-up reel shown in FIG. 1 comprises a shaft 11 which is rotatably journalled in a cover 10 and on which a strap 12 of the seat belt can be wound. As shown at the left hand side of FIG. 1, the shaft is attached to the inner end of a helical spring 13, the outer end (not visible) of which is rigidly attached to a cap 14, mounted on the cover 10. The helical spring 13 will be tensioned, when the shaft is rotated due to extension of the strap 12, and will bring the shaft to rotate in opposite direction, when the extension force in the strap is discontinued, so that the strap automatically is rewound on the shaft, when the seat belt is not in use, and always is kept under tension, when a person is embraced in the seat belt. The shaft 11 is locked against axial movement by two plates 15 attached to the shaft adjacent the walls of the cover 10. As shown at the right end of FIG. 1, the shaft is provided with a locking device which is designed to provide locking of the shaft when the strap is rapidly extended, for example if the person embraced in the seat belt is thrown forwards, and which is also designed to allow a slow extension of the strap, for example if the person embraced in the seat belt is leaning slowly forwards.

The locking device comprises a disc-shaped rotatable body 16, which is rigidly attached to the shaft outside the cover 10 and which is arranged to follow the shaft in its rotation, and a stop ring 17, which is attached to the cover 10 and which is positioned concentrically with the shaft, the ring surrounding the rotatable body with a small space. The stop ring 17 is on its inner surface, which faces the rotatable body, provided with a number of arcuate recesses 18 following each other continuously and designed to provide engagement surfaces for locking members, as shall be explained more in detail below. Three cylinder-shaped locking members 19 are provided between the rotatable body 16 and the stop ring 17, as more clearly shown in FIG. 2. These cylinders are movable in notches 20 in the peripheral surface of the rotatable body, and each notch 20 is so designed that it forms two arcuate pockets 21, 22 for the locking cylinder 19. One pocket 21 is deeper and positioned closer to the center axis of the shaft 11, and the other pocket 22 is more shallow and positioned at a larger distance from the axis of the shaft. A rigid wall 21a is provided between the pockets. When the locking cylinder 19 is in the deeper pocket 21, it does not extend outside the periphery of the rotatable body and, thus, does not prevent turning or rotation of the rotatable body. When the locking cylinder is in the more shallow pocket 22, it extends partly outside the periphery of the rotatable body and engages with the stop ring 17, so that turning of the rotatable body 16 is prevented. The arcuate recesses 18 in the stop ring and the arcuate pockets 21, 22 in the rotatable body have a radius of curvature which substantially agrees with the radius of the locking cylinders, so that large contact surfaces are obtained between the locking cylinders and the rotatable body and the stop ring, respectively.

The portion of the shaft 11 on which the rotatable body 16 is attached has a substantially square cross section, as more clearly indicated in FIG. 2, and the central aperture of the rotatable body is matched to the shape of the shaft, so that the rotatable body is unrotatably attached to the shaft and, thus, always follows the shaft in its turning or rotation.

As shown in FIG. 1, the locking cylinders are provided with a locking portion 19a, the length of which is substantially equal to the thickness of the disc-shaped rotatable body 16, so that the locking cylinders have large contact surfaces with the stop ring and the rotatable body. The locking cylinders are further provided with a waist portion 19b, which has a smaller diameter than the locking portion and which has a length substantially equal to the thickness of an inertia disc 23, which will be more closely described below, and with a stop portion 19c, which has substantially the same diameter as the locking portion 19a. Due to the fact that the locking portion and the stop portion have a larger diameter than the waist portion and are positioned on either side of the inertia disc and in close proximity to this disc axial movement of the locking cylinder in relation to the inertia disc is prevented.

A circular disc 23 with a comparatively large mass is rotatably mounted on the shaft 11 outside and adjacent the rotatable body 16. The disc 23 is attached to the shaft by means of a nut 11a screwed onto the end of the shaft. Due to the fact that the disc has a comparatively large mass, it will act as an inertia means. The inertia disc is provided with three guiding slots 24 bent to an angle, as shown in FIG. 3, and these guiding slots are provided for guiding each one of the three locking cylinders 19. The width of the guiding slots is matched after the waist portion of the pertaining locking cylinder, so that the locking cylinders can run in the guiding slots with a close fit. Each guiding slot opens into a through circular hole 25, which has such a large diameter that the stop portion 19c of the locking cylinder can be moved into the hole and moved through the inertia disc, until the waist portion of the locking cylinder is positioned completely within the inertia disc. Then the waist portion can be moved into the guiding slot. After the insertion into the guiding slot, the locking cylinder cannot be moved in axial direction, as the waist portion 19b has a length which closely corresponds to the thickness of the inertia disc and the end portions 19a, 19c lying outside the waist portion have a larger diameter than the waist portion.

The inertia disc 23 and the shaft 11 are arranged to rotate counter-clockwise in FIGS. 2 and 3 when the strap is extended from the shaft. The inertia disc has to follow the shaft at slow but not at rapid rotation, and to this end a spring is provided between the shaft and the inertia disc. The spring consists of an elongated spring wire 26 which passes through a cross hole 27 in the shaft and extends on both sides of the shaft. The ends 26a, b of the spring wire are connected with the inertia disc 23 by means of taps 28 (holding means), as illustrated, extending from the inertia disc and positioned pairwise at a distance corresponding to the wire diameter, so that the ends of the wire can be pushed down between the tabs and, thus, kept in a determined position on the inertia disc. So that spring tension can be adjusted, the ends 26a, b can be connected by means of alternative taps 28' (holding means) extending from the disc 23 and positioned pairwise like taps 28. The spring wire is so attached and pretensioned that it tends to turn the inertia disc counter-clockwise with respect to the shaft, until the inertia disc is in a position in relation to the shaft in which the locking cylinders 19 are kept in their free positions. In this position the inertia disc is prevented from further turning in relation to the shaft by the locking cylinders, which then are in the deeper pockets 21, so that the waist portions of the locking cylinders operate as stop tabs for the inertia disc. This position is shown in FIG. 3, and in this position, too, the spring wire is to some extent tensioned which gives the advantage that the locking cylinders are kept in the pockets by the inertia disc, so that the locking cylinders do not rattle in case of vibrations or shakings of the vehicle. In the shown embodiment, this pretensioning of the spring is provided by displacement of the ends of the spring wire in relation to the cross hole through the shaft.

As shown in FIG. 3, the guiding slots 24 for the locking cylinders 19 are not radially directed at their inner portions, but form an acute angle with the direction running through the inner portion of the slots radially outwards. This angle can be chosen within wide limits, but should be between 5° and 60°, for example between 20° and 40°, and can preferably be about 30°. In the shown embodiment, the guiding slots lean forwards in relation to the radial direction, seen in the direction of rotation obtained when the strap is slowly extended from the shaft. The outer portions of the slots 24 are bent to an angle outwards towards the periphery of the inertia disc, and these portions of the guiding slots run substantially in radial direction. By this angular form of the guiding slots, the essential advantage is obtained that the inner portions of the guiding slots completely or at least to a high extent eliminate the influence of the radially directed centrifugal force on the movement of the locking cylinders and prevent unintensional locking due to engagement between the locking cylinders and the stop ring when the strap is wound onto the shaft or due to shakings or vibrations in the vehicle, at the same time as the radial direction of the outer portions of the guiding slots provide that the locking cylinders as soon as possible and under a completely radial movement are moved into the locking position in which they are in engagement with the stop ring.

The inertia disc 23 can also be braked by a vehicle sensitive device, so that the shaft is locked, even if the strap is not extended rapidly. Such a vehicle sensitive device can comprise a pendulum or a locking arm 29 of the type shown at the bottom of FIG. 3. This locking arm is pivotally mounted on a retainer 30, in which a tiltable inertia means 31 is positioned. This inertia means 31 tilts when the speed or direction of the vehicle is rapidly changed to a position abutting the wall of the retainer and moves the arm 29 to engagement with teeth 32 on the inertia disc 23.

The locking device and the vehicle sensitive device, if such a device is used, are included in a cap 33 attached to the cover 10.

The above described locking device operates in the following way. When the strap of the seat belt is extended, for example due to the fact that a person embraced in the seat belt slowly leans forward, the shaft is forced to turn slowly and the inertia disc then follows the shaft in its rotation due to the action of the spring wire. The strap in the seat belt can then be further extended, as the locking cylinders are not moved from their free positions. When the strap in the seat belt is rapidly extended, for example due to a forceful braking or a collision, the shaft is turned rapidly, and due to its large mass and the flexibility of the spring wire, the inertia disc does not follow the shaft in its rotation, but is turned on the shaft in relation to the rotatable body, so that the notches in the rotatable body move the locking cylinders in the guiding slots in the inertia disc from the free positions to the locking positions. Because the locking cylinders then come into engagement with both the stop ring and the rotatable body, further turning of the rotatable body and the shaft is prevented. Therefore, the strap of the seat belt cannot be further extended, but fulfills its function as holding means for the person embraced in the seat belt, as long as the tension in the strap is maintained. When this tension ceases, the inertia disc is returned by the spring wire to its normal position, and the locking cylinders are then returned to their respective free positions, so that the strap again can be slowly extended from the shaft.

While only one embodiment of the locking device according to the invention has been described and shown, it is evident that a number of modifications and variations are possible within the frame of the invention. The number of locking members can for instance be less than three, but it is convenient to use at least two, because in that case a good balancing of the appearing forces can be obtained. The locking members do not need to be cylindrical, but can have an arbitrary cross section. However, they should have an elongated form, so that they can enter into the inertia means and be guided in a slot herein. The locking members do not need to have a waist portion, and the axial movement of the locking members can be prevented in another way, for example by providing locking means outside the ends of the locking members. In such a case, the larger entrance apertures in the inertia means are not necessary. The slots in the rotatable body do not need to have a wall between the two pockets, but it is an advantage, because it makes the locking positions and the free positions more distinctive. The rotatable body can also be a portion of the shaft. The stop ring can be provided with teeth with another shape or with a friction surface. The spring means can also be designed in other ways, for example as a helical spring or a leaf spring, and be positioned in another way between the shaft and the inertia means. The clamping of the spring ends can also be provided in different ways, so that either several or movable attaching means can be used for adjusting or matching the spring tension after different requirements. Furthermore, the guiding slot can be straight or bow-shaped and also form a straight or obtuse angle with the radius. The slot can lean either forward or backward in relation to the radius, as seen in the direction of rotation of the inertia means when the strap of the seat belt is slowly extended. In the last mentioned case the slot in the rotatable body has to be somewhat modified for obtaining the best result.

I claim:

1. In a locking device for safety seat belts of vehicles in which a strap of a seat belt is automatically retracted and wound onto a wind-up shaft when the seat belt is not in use to prevent rapid extension of the strap, the device including a rotatable body unrotatably attached to one end of said shaft, said body having a guiding surface and arranged to rotate with the shaft, stop means positioned outside the rotatable body and fixedly mounted in relation to the shaft, and at least one elongated locking member movable in relation to the rotatable body and positioned between the rotatable body and the stop means, the locking member being movable on the guiding surface on the rotatable body from a radially inner, free portion, in which it does not prevent rotation of the rotatable body, to a radially outer locking position, in which it engages with both the stop means and the rotatable body and, thus, prevents further turning of the rotatable body, the improvement comprising:

inertia means having a periphery and a relatively large inertia, pivotally mounted on said shaft and positioned adjacent to said rotatable body;

a respective slot provided in said inertia means for each said locking member, said slot having an outer portion extending towards said periphery and, at least at its inner portion, forming an angle with a radius passing through the inner end of the slot, a portion of said locking member extending into and being guided thereby, said inner portion of said slot guiding said locking member in its free position and said outer portion of said slot guiding said locking member in its locking position;

and spring means coupled to said rotatable body and to said inertia means for keeping said body and said inertia means in a determined angular position in relation to one another when said strap is slowly extended and for yielding when said strap is rapidly extended so that said rotatable body and said inertia means change angular position in relation to one another, whereby the locking member is moved in the slot of the inertia means from its free position to its locking position when the strap is rapidly extended.

2. An improved device according to claim 1, wherein said outer portion of said slot is bent in an angle relative to said inner portion of said slot towards the periphery of said rotatable body.

3. An improved locking device according to claim 1, wherein said inner portion of said slot forms an acute angle with said radius passing through said inner end of said slot and having an outward direction.

4. An improved device according to claim 3, wherein said slot is angularly positioned in the direction of rotation with respect to a given radius when said inertia means rotates during extension of said strap from said shaft.

5. An improved locking device according to claim 3, wherein said inner portion of said slot forms an angle of between 5° and 60°, preferably about 30°, with respect to a radius passing along the length of said outer portion of said slot.

6. An improved locking device according to claim 2, wherein said outer portion of the slot runs substantially in the direction of a radius of said inertia means.

7. An improved locking device according to claim 1, wherein said stop means is a ring which is coaxial with said shaft and surrounds said rotatable body, an inner edge surface of which is provided with a plurality of spaced apart arcuate recesses; wherein said rotatable body is a circular disc in the periphery of which a notch is provided for receiving each respective said locking member, a bottom of said notch defining said guiding surface for said locking member in its movement between its two positions, and wherein said locking member is a cylinder and said bottom of said notch is provided with an inner and an outer arcuate pocket, with an interpositioned fixed wall, said inner pocket being of greater depth than said outer pocket, the radius of curvature of arcuate surfaces of said stop means and of said arcuate pockets substantially corresponding to the radius of said locking member in the form of a cylinder.

8. An improved locking device according to claim 7, wherein said locking cylinder extends from said rotatable body through said inertia means to the opposite side of said inertia means, a portion of said locking member running through said inertia means having a smaller diameter than the diameters of ends of said locking member so that said locking cylinder is maintained in said slot in said inertia means by its thicker end portions.

9. An improved locking device according to claim 8, wherein that end portion of said locking cylinder cooperating with said rotatable body and said stop means is longer than its opposite end portion.

10. An improved locking device according to claim 8, wherein said slot in said inertia means at its radially inner end opens into an aperture in said inertia means, which aperture is sufficiently large for allowing entrance of an end of said locking member remote from said rotatable body.

11. An improved locking device according to claim 1, wherein said spring means is a spring wire connected to said shaft and arranged to rotate with said shaft and with said inertia means so that said inertia means normally is kept by the spring wire in that position with regard to said shaft in which said locking member is kept in its free position.

12. An improved locking device according to claim 11, wherein said spring wire extends through a recess in said shaft and extends on both sides of said shaft, both ends of said spring wire being attached to said inertia means.

13. An improved locking device according to claim 12, wherein said inertia means is provided with holding means for the ends of said spring wire.

14. An improved locking device according to claim 13, further including a plurality of alternative holding means arranged for receiving said ends of said spring wire so that spring tension can be adjusted by choosing holding means.

* * * * *